United States Patent
Heindtel et al.

(10) Patent No.: US 10,760,228 B2
(45) Date of Patent: Sep. 1, 2020

(54) ROAD FINISHER WITH POWER ADJUSTERS FOR ELECTRIC PAVING SCREED HEATING DEVICES

(71) Applicant: JOSEPH VOEGELE AG, Ludwigshafen/Rhein (DE)

(72) Inventors: Michael Heindtel, Mannheim (DE); Achim Eul, Mannheim (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 0 days.

(21) Appl. No.: 16/278,782

(22) Filed: Feb. 19, 2019

(65) Prior Publication Data

US 2019/0257041 A1 Aug. 22, 2019

(30) Foreign Application Priority Data

Feb. 19, 2018 (EP) ..................................... 18157386

(51) Int. Cl.
*E01C 19/48* (2006.01)
*B60R 16/03* (2006.01)
*H05B 1/02* (2006.01)

(52) U.S. Cl.
CPC .......... *E01C 19/4873* (2013.01); *B60R 16/03* (2013.01); *E01C 19/48* (2013.01);
(Continued)

(58) Field of Classification Search
CPC .... E01C 19/023; E01C 19/48; E01C 19/4873; E01C 2301/10; E01C 2301/14; B60R 16/03; H05B 1/023
(Continued)

(56) References Cited

U.S. PATENT DOCUMENTS

| 6,334,735 B1 * | 1/2002 | Williams ................ E01C 19/48 404/79 |
| 6,421,594 B1 | 7/2002 | Erasmus |

(Continued)

FOREIGN PATENT DOCUMENTS

| EP | 1 036 883 B1 | 7/2004 |
| EP | 1 295 990 B2 | 12/2012 |

(Continued)

OTHER PUBLICATIONS

Extended European Search Report dated Jul. 26, 2018, Application No. 18157386.6-1002, Applicant Joseph Voegele AG, 5 Pages.

*Primary Examiner* — Raymond W Addie
(74) *Attorney, Agent, or Firm* — Brooks Kushman P.C.

(57) ABSTRACT

A road finisher comprises a towing vehicle including a material hopper at a front in a paving travel direction for receiving paving material, and a paving screed which is pulled behind the towing vehicle in the paving travel direction for compacting paving material. A generator for providing electrical power is provided on the towing vehicle. A plurality of electric heating devices is provided on the paving screed for heating the paving screed. The road finisher further comprises a power distribution arrangement having a line network configured to supply the heating devices with power provided by the generator. The power distribution arrangement comprises a plurality of power adjusters provided on the paving screed and each power adjusted is associated with one of the heating devices. The road finisher comprises a control device configured to control the power adjusters to individually dynamically adjust the power supplied to the respectively associated heating device.

20 Claims, 2 Drawing Sheets

(52) U.S. Cl.
CPC .......... *H05B 1/023* (2013.01); *E01C 2301/10* (2013.01); *E01C 2301/14* (2013.01)

(58) Field of Classification Search
USPC ............................ 404/77, 79, 84.05, 95, 118
See application file for complete search history.

(56) References Cited

U.S. PATENT DOCUMENTS

| | | | |
|---|---|---|---|
| 8,636,442 B1* | 1/2014 | Sopko, Jr. ................ | E01C 19/48 404/118 |
| 10,280,572 B1* | 5/2019 | Thiesse ................ | H05B 1/0294 |
| 2009/0257825 A1* | 10/2009 | Nelson .................... | E01C 19/48 404/95 |
| 2011/0091278 A1* | 4/2011 | Munz ...................... | E01C 19/40 404/118 |
| 2012/0087726 A1* | 4/2012 | Smieja .................... | E01C 19/48 404/79 |
| 2015/0003914 A1* | 1/2015 | Steinhagen ............. | E01C 19/48 404/118 |
| 2015/0361626 A1 | 12/2015 | Trox et al. | |
| 2016/0186389 A1* | 6/2016 | Graham .................. | E01C 19/48 404/79 |
| 2016/0289902 A1* | 10/2016 | Eul ......................... | H04L 12/40 |
| 2019/0047569 A1* | 2/2019 | Lachmann .............. | E01C 19/48 |
| 2019/0352863 A1* | 11/2019 | Noll ....................... | B60K 11/02 |

FOREIGN PATENT DOCUMENTS

| | | |
|---|---|---|
| JP | 2015-206172 A | 11/2015 |
| WO | 00/47822 A1 | 8/2000 |
| WO | 2014/124545 A1 | 8/2014 |

\* cited by examiner

ROAD FINISHER WITH POWER ADJUSTERS FOR ELECTRIC PAVING SCREED HEATING DEVICES

CROSS-REFERENCE TO RELATED APPLICATIONS

This application claims foreign priority benefits under 35 U.S.C. § 119(a)-(d) to European patent application number EP 18157386.6, filed Feb. 19, 2018, which is incorporated by reference in its entirety.

TECHNICAL FIELD

The disclosure refers to a road finisher with electric heating of the paving screed.

BACKGROUND

Known road finishers comprise a material hopper for receiving paving material that is at the front of the road finisher's towing vehicle with respect to a paving travel direction. During paving, the paving material is conveyed from the material hopper to a rear portion of the road finisher via a suitable longitudinal conveying device. There, the paving material is distributed transversely to the paving travel direction using a distribution auger and is thus fed uniformly to a paving screed pulled behind by the towing vehicle for compacting the paving material. It is known that working components of the paving screed, such as tamper bars, smoothing plates and/or press bars, are heated electrically or with gas to prevent the hot paving material from sticking to the working components. In the case of electric heating, resistance heating elements are distributed in the paving screed, which are supplied with three-phase current by a three-phase generator provided on the towing vehicle.

EP 1 036 883 B1 found that permanent operation of the electric heating elements of the paving screed at full power places a heavy load on the three-phase generator under unfavorable operating conditions and can also have low energy efficiency. In order to solve these problems, it is proposed that the electric heating elements of the paving screed should be switched in cycles. From a three-phase generator provided on the towing vehicle, supply lines lead to the electric heating elements integrated on the two screed halves (left and right screed half) of the paving screed. Contactors are provided in the supply lines outside the paving screed. The temperature of the three-phase generator is monitored by using temperature-dependent resistors in the windings of the three-phase generator. If the temperature of the generator exceeds a certain threshold value, the operation of the heating elements of the paving screed is switched to clocked operation. This means, for example, that the heating elements of the left screed half are switched off for a predetermined period of time, e.g., 30 seconds, and only the heating elements in the right screed half remain switched on. When the predetermined time has elapsed, the heating elements of the right screed half are switched off and the heating elements of the left screed half are switched on again. This is repeated permanently, allowing the three-phase generator to cool down again. Although such a system can protect the generator against overheating, the achievable energy efficiency can still be improved.

EP 1 295 990 B2 discloses a road finisher with a paving screed with a base screed part and extension parts provided on both sides thereof to increase the paving width. The paving screed is divided into four sections, of which two are positioned on the base screed and one on each of the two extension parts. Four resistance heating elements are provided in each of the sections to heat the respective screed section. The heating elements are connected to a generator of the road finisher via relay switches provided outside the paving screed for energy supply, with a common relay switch connected upstream of two adjacent heating elements. With a control device, the relay switches corresponding to the heating elements of a section are closed to feed the heating elements if a temperature measured at the section is below a first threshold value. If the measured temperature exceeds a higher, second threshold value, the associated relay switches are opened again to interrupt the heating of the section. This is to keep the screed sections in a suitable temperature window. A particular disadvantage of this system is the high cabling effort. In addition, the energy efficiency can still be improved here.

SUMMARY

It is an object of the present disclosure to provide a road finisher with electric screed heating devices, which is improved in terms of cabling effort and energy efficiency.

A road finisher according to the disclosure comprises a towing vehicle and a paving screed pulled behind the towing vehicle with respect to the paving travel direction of the road finisher to compact paving material. In the paving travel direction at the front of the towing vehicle, a material hopper is provided for receiving paving material. The towing vehicle comprises a generator, in particular a three-phase generator, for providing electrical power. The generator is preferably operated via a primary drive unit of the road finisher, in particular a diesel engine. A plurality of electric heating devices, in particular resistance heating devices, is provided on the paving screed for electrically heating the paving screed. The road finisher comprises a power distribution arrangement with a line network configured to supply the electric heating devices with the electrical power provided by the generator. The power distribution arrangement comprises a plurality of power adjusters provided on the paving screed, each associated with one of the electric heating devices. A control device of the road finisher is configured to control the power adjusters to individually dynamically adjust the power supplied to the respectively associated electric heating device.

The energy efficiency of the screed heating system can be significantly improved by setting the individual power adjusters individually dynamically. When the road finisher is in operation, the heating devices can be individually adapted to the heating output required at the location of the respective heating device. The generator voltage can be kept largely stable, especially in a favorable operating range.

The fact that the power adjusters are provided directly on the paving screed reduces the amount of cabling and wiring required. Thus, a division to a plurality of separate screed heating circuits is not already required in the part of the line network located on the towing vehicle, which reduces the amount of material required for wiring the heating devices and also makes it easier to electrically connect the paving screed to the towing vehicle. The space required in a control cabinet on the towing vehicle of the road finisher is reduced.

The power adjusters are preferably configured to continuously adjust the power supplied to the respectively associated electric heating device. This means that the heating output for each heating device can be adapted precisely to the current demand and preferably operated continuously with the set power requirement until there is a change in the power requirement. This can increase the energy efficiency. In addition, the screed temperature can be maintained evenly over time and space, which can have a positive effect on the paving result.

The power adjusters may include, for example, power controllers and/or power switches. The use of thyristor controllers is particularly preferred. Power controllers or power switches can be used to variably adjust the power supplied to a heating element from 0-100%. Power controllers and power switches are commercially available without any problems.

The power adjusters can be configured to individually adjust the power supplied to the respectively associated heating device by pulse package control. For this purpose, the power adjusters can be configured to operate a particularly low-frequency, individual clocking of the respectively associated heating device, so that only a certain number of sine waves of the supply current are transmitted in each clocking cycle. By changing the individual cycle, the power supplied to the associated heating device can be set individually. A pulse package control is particularly advantageous if the power adjusters include power switches.

It would also be conceivable that the power adjusters are configured to adjust the power supplied to the respectively associated heating device by phase angle control. For this purpose, the power adjusters can be configured to allow sine waves of the supply current to pass through only in part. For example, depending on the power to be supplied, a portion of each sine wave at the beginning or end of the sine wave can be "cut off" and not fed to the power adjuster. By adapting the cut-off portion, the power supplied to the associated heating device can be set individually. Phase angle control is particularly advantageous if the power adjusters include power controllers.

Preferably, the power adjusters in the line network are electrically connected upstream of the associated electric heating device. In particular, the respective power adjusters can be directly connected upstream of the associated electric heating device.

Preferably, the power adjusters are connected in parallel to each other. This makes it particularly easy to individually adjust the power supplied to the individual heating devices.

The part of the line network located on the paving screed may have nodes at which the line network branches off at least towards different power adjusters and the associated heating devices. The fact that the nodes are provided on the paving screed reduces the material required for the road finisher's cabling. It also simplifies the electrical connection of the paving screed to the road finisher and thus replacement of the paving screed.

The line network can include a main fuse, which is connected downstream of the generator and upstream of all heating devices. In particular, such a main fuse can easily be connected directly downstream of the generator.

The control device may be configured to determine a setting value for each of the power adjusters and to control the power adjusters based on the respective setting value. In particular, the setting values for the power adjusters can be determined individually and/or independently of each other. A setting value can correspond to a kind of setpoint for the heating output of the associated heating device. This setpoint can be implemented directly and immediately via the power adjusters.

Preferably, the road finisher comprises an input device which enables an operator to enter the setting value for all heating devices together, for groups of heating devices and/or for individual heating devices. The operator can directly enter the heating output depending on the operating conditions, such as the type of paving material used, the outside temperature, the weather, a temperature of the paving material, the type of layer to be laid (e.g., surface course or base course), etc., and thus control the output of the individual heating devices. In embodiments in which it is possible to enter the setting value for groups of heating devices or for individual heating devices, the operator can individually set whether and to what extent certain areas of the paving screed should be heated more. For example, heating devices on the lateral extension parts of an extending screed can be fed with more power, as the paving material may already have cooled down to a certain extent by the time it reaches the outer side areas of the road section.

It would also be conceivable that the setting values are generated automatically by the control device, for example based on sensor information (e.g., outside temperature, temperature of the paving material and/or paving thickness) and/or known paving parameters (e.g., type of layer to be paved, screed configuration and/or type of paving material used).

Preferably, the road finisher comprises one or more temperature sensors on the paving screed. The control device may be configured to take into account one or more outputs from the temperature sensor or sensors, in addition to the setting value, when controlling the power adjusters. It would also be possible for the control device to be configured to determine the setting values based on outputs from the temperature sensor or sensors. By considering the outputs of the temperature sensor or sensors, the temperature of certain areas of the paving screed or the temperature of the paving screed as a whole can be set to a desired temperature range. The outputs of the temperature sensor or sensors could also be used by the control device to detect and prevent the screed from overheating and/or falling below a minimum temperature.

Preferably, a temperature sensor is assigned to each power adjuster. The output of the respective temperature sensor can be used to determine the setting value for the associated power adjuster or can be taken into account in addition to the respective setting value. In this way, the temperature at the individual heating elements can be individually set to a desired value and maintained there.

Preferably, the control device is configured to control the power adjusters via a power line communication on the line network to supply the heating devices with the electrical power provided by the generator. This means that it is not necessary to provide additional control lines to control the power adjusters. However, it would also be conceivable to control the power adjusters alternatively via separate analog or digital control lines. The control of the power adjusters could in particular take place via a bus system. For example, the power adjusters could be controlled via a CAN bus or via a one-wire connection.

The power adjusters are preferably configured to detect a failure or fault condition of the associated heating device and report it to the control device. This eliminates the need for additional monitoring units and fault data is centrally available on the control unit.

In the following, an embodiment according to the disclosure will be further explained with reference to the attached drawings.

DETAILED DESCRIPTION

Figure 1:
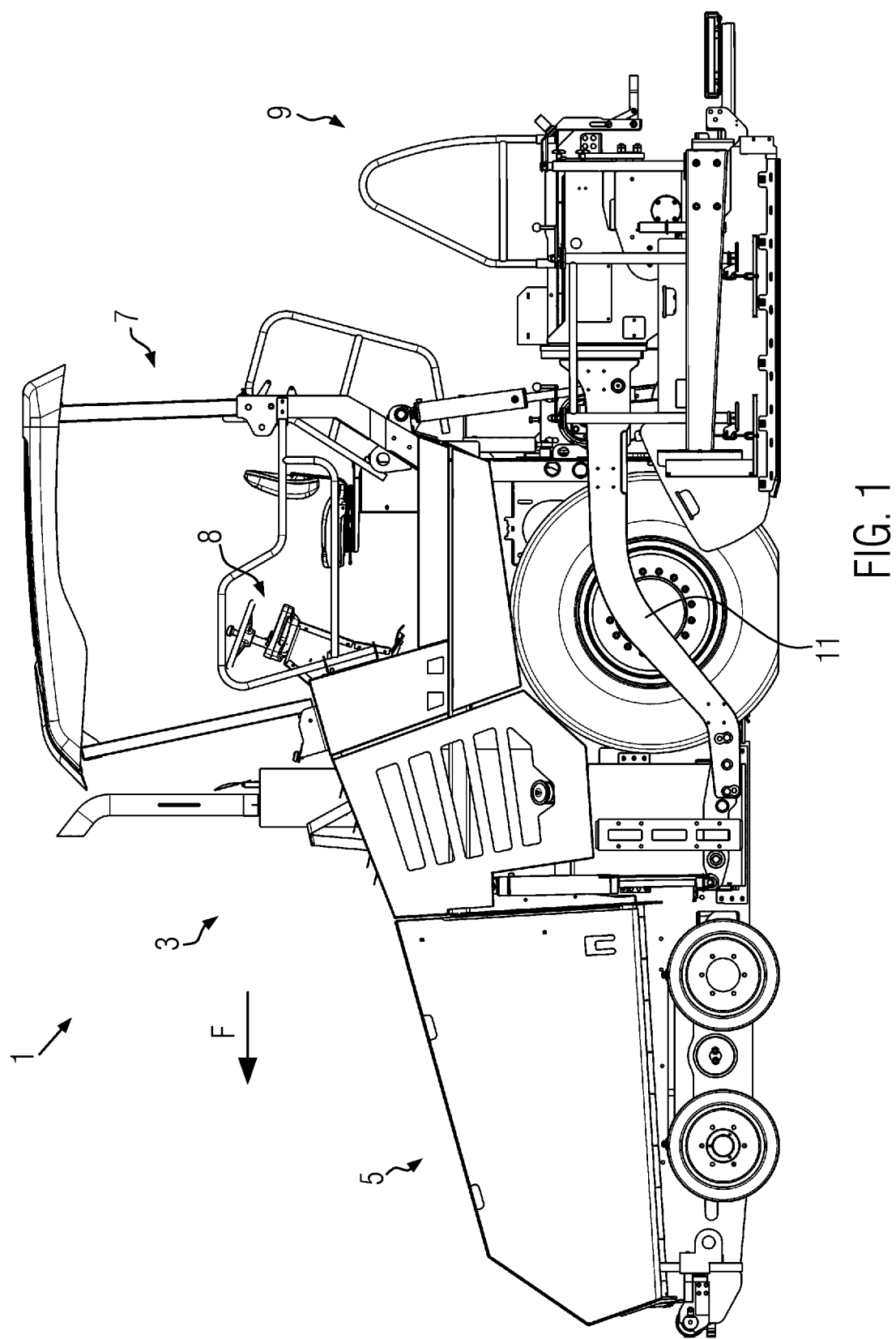
FIG. 1 shows a schematic side view of a road finisher according to an embodiment.

FIG. 1 shows a schematic side view of a road finisher 1 according to the disclosure according to an embodiment. The road finisher 1 comprises a self-propelled towing vehicle 3 with a material hopper 5 located at the front in paving travel direction F for receiving paving material. An operating platform 7 is also provided on the towing vehicle 3, which comprises input devices 8 for controlling the road finisher 1 and provides space for an operator. A paving screed 9 for compacting paving material is pulled behind the towing vehicle 3 by way of drawbars 11 attached to both sides of the towing vehicle 3. The towing vehicle 3 is equipped with a conveying device for conveying paving material from the material hopper 5 into a rear portion of the road finisher 1. In the rear portion of the road finisher 1, the paving material leaves the conveying device through a material outlet and reaches a distribution auger 13 (see FIG. 2) for distributing the paving material in front of the paving screed 9 in a direction transverse to the paving travel direction F.

Figure 2:
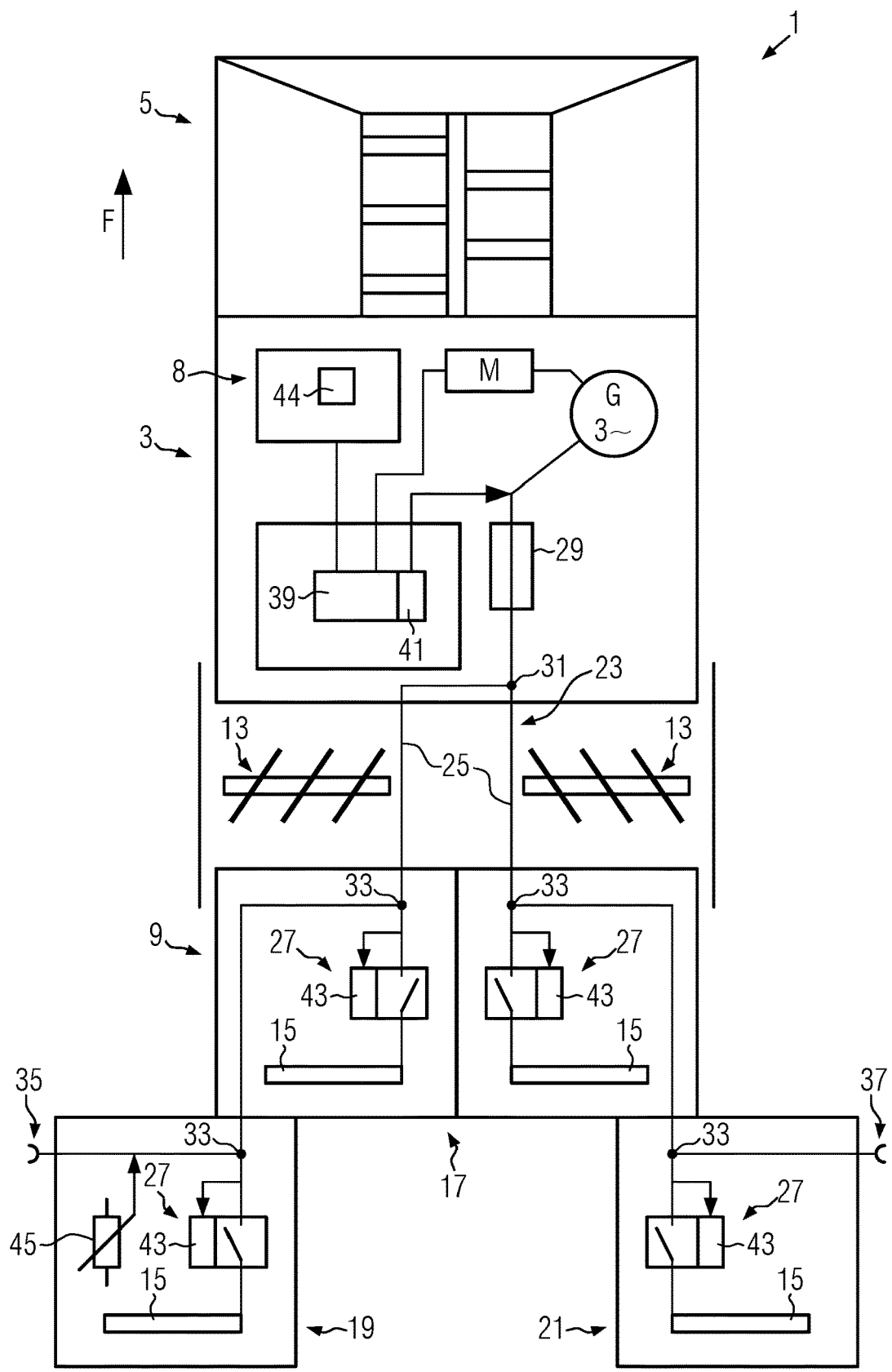
FIG. 2 shows a schematic representation of the road finisher according to the embodiment as a block diagram in plan view.

As shown in FIG. 2, a generator G is provided on the towing vehicle 3, in the present embodiment a three-phase generator. The generator G is driven by the primary drive unit M of the road finisher 1, for example a diesel engine, and provides electrical power. A plurality of electric heating devices 15 are provided on the paving screed 9 for electrically heating the paving screed 9. The heating devices 15 may be resistance heating elements, in particular heating rods. The heating devices 15 may be designed to heat the paving screed 9 substantially to the temperature of the hot paving material in order to prevent the paving material from sticking to the paving screed 9. In the illustrated embodiment, the paving screed 9 is an extending screed with a base screed 17 and, with respect to the paving travel direction F, extension parts 19, 21 mounted on both sides thereof, which can be retracted and extended to adjust the paving width. However, it would also be conceivable that the paving screed 9 only comprises the base screed 17, or that extension parts 19, 21 are provided.

Electric heating devices 15 are provided on both the base screed 17 and the extension parts 19, 21. The road finisher 1 comprises a power distribution arrangement 23 with a line network 25, which supplies the electric heating devices 15 with the electrical power provided by the generator G. The power distribution arrangement 23 also comprises a plurality of power adjusters 27, each of which is assigned to one of the electric heating devices 15. The power adjusters 27 are directly electrically connected upstream of the associated electric heating device 15 in the line network 25 and are designed to continuously adjust the power supplied to the respectively associated electric heating device 15.

The power adjusters 27 can, for example, be power controllers, with thyristor controllers being particularly preferred. Such power controllers can be configured to adjust the power supplied to the respectively associated heating device 15 by phase angle control. For this purpose, the power controllers can only partially allow sine waves of the supply current to pass through. For example, if required, a portion of each sine wave at the beginning or end of the sine wave can be cut off depending on the power to be supplied, i.e., it cannot be supplied to the associated power adjuster. For example, by adapting the length of the cut-off portion, the power supplied to the associated heating device 15 can be set individually.

It is also possible to design the power adjusters 27 as power switches. Such power switches can be designed to individually adjust the power supplied to the respectively associated heating device 15 by pulse package control. The power switches can set the power of the respectively associated heating device 15, for example, by low-frequency individual clocking, so that only a certain number of sine waves of the supply current are transmitted in each clock. The power supplied to the associated heating device 15 can be set individually by changing the individual clocking. In particular, each electric heating device 15 can be operated individually in a range between 0-100% of its rated power by using the power adjusters 27.

As shown in FIG. 2, the power adjusters 27 in the line network 25 are connected in parallel to each other. The line network 25 comprises a main fuse 29, which is connected directly downstream of the generator G in particular and upstream of all heating devices 15. The main fuse 29 can be provided on the towing vehicle 3, in particular in a fuse box of the towing vehicle 3. In the embodiment shown, a first node 31 of the line network 25 is provided on the towing vehicle 3. Here the power supply is divided between heating devices 15 present at the left and right of a central axis of the base screed 17. However, this is not absolutely necessary, and the division could also be carried out entirely on the paving screed 9. At the paving screed 9, the line network 25 comprises further nodes 33, at which the line network 25 branches towards different power adjusters 27 and the associated heating devices 15 according to a parallel circuit diagram. The power adjusters 27 are each provided between the associated heating device 15 and the corresponding node 33.

In the embodiment shown, connections 35, 37 which are connected to the line network 25 are provided at the extension parts 19, 21 of the paving screed 9, the connections serving the electrical supply of optionally attachable further screed parts.

The road finisher 1 comprises a control device 39 which is configured to control the power adjusters 27 to individually dynamically adjust the power supplied to the respectively associated electric heating device 15. In the illustrated embodiment, the communication between the control device 39 and the power adjusters 27 takes place via a power line communication (PLC) on the line network 25. Lines of the line network 25 thus serve simultaneously to supply the heating devices 15 with power from the generator G and to transmit communication or commands between the control device 39 and the power adjusters 27. As shown in FIG. 2, the control device 39 can comprise a transmitter and receiver unit 41 for transmitting and receiving signals via power line communication via the line network 25. The power adjusters 27 may include receiver units 43 for receiving signals from the control device 39 via power line communication. Preferably, the power adjusters 27 are also configured to detect a failure or fault condition of the associated heating device 15 and report it to the control device 39. For this purpose, the receiving units 43 of the power adjusters 27 can be designed as transmitting and receiving units for power line communication, for example, and thus permit bidirectional communication with the control device 39. Failures or fault conditions of heating devices 15 can, for example, be indicated on a display 44 provided on the input unit 8 by using the control device 39.

As mentioned above, the control device 39 is configured to individually dynamically control the power adjusters 27 to adapt the power supplied to the respectively associated electric heating device 15. For this purpose, the control device 39 can determine a setting value for each power adjuster 27, based on which the power adjuster 27 is then controlled. The setting may indicate a particular one of the power levels to be supplied to the heating device 15 corresponding to the respective power adjuster 27. The control device 39 can determine a separate setting value for each power adjuster 27, whereby the values of the setting values can certainly be identical for all heating devices 15. The setting values can be adjusted individually and singly by the control device 39.

According to an embodiment, the setting values can be entered by an operator using the input device 8. The setting values can be entered for all heating devices 15 together, for groups of heating devices 15 or for individual heating devices 15. It is also conceivable that the operator can choose between an input for all heating devices 15 together, for groups of heating devices 15 and/or for individual heating devices 15. For example, the setting values can be entered as percentages which indicate the heating output desired for a particular heating device 15 as a percentage of the nominal output of the heating device 15 (e.g., 0-100%). An operator can enter a desired setting value depending, for example, on the paving material used and/or the outdoor temperature. Moreover, the setting value can for example be adapted to the paving travel speed of the road finisher 1 as required. The operator can also supply the individual heating devices 15 with different outputs. For example, heating devices 15 of the extension parts 19 and 21 of the paving screed 9 can be supplied with higher heating output. If the paving width is changed and the extension parts 19, 21 of the paving screed 9 are extended accordingly, the heating output can be adjusted to suit the respectively external heating devices 15 in particular. Preferably, the setting values can be adjusted at any time during the operation of the road finisher 1.

Optionally, a temperature sensor 45 may be provided on the paving screed 9. The temperature sensor 45 can measure a temperature on the paving screed 9 and transmit a measurement result to the control device 39, in particular via power line communication. The control device 39 can be configured to take into account the output of the temperature sensor 45 in addition to the setting values entered in particular by the user when controlling the power adjusters 27. For example, the control device 39 could be configured to automatically increase the power supplied to the heating devices 15 when the temperature sensor 45 reports a falling below a predetermined threshold temperature. In a simple embodiment, it is sufficient if only one temperature sensor 45 is provided. As in the illustrated embodiment, this sensor could be provided in a lateral outer portion of the paving screed 9 because the lowest temperatures are to be expected here. However, according to a further development, it would also be conceivable to provide a multitude of temperature sensors 45. In particular, a temperature sensor 45 could be assigned to each power adjuster 27. In this case, the setting values could be adapted based on the output of the temperature sensor 45 assigned to the corresponding power adjuster 27.

It goes without saying that the communication between the control device 39 and the power adjusters 27 or the temperature sensor 45 does not necessarily have to take place via a power line communication. It would also be conceivable to provide separate control lines or signal lines and to control the power adjusters 27 via these with an analog or digital signal. It would also be conceivable to provide separate signal lines to the temperature sensor 45. In particular, the power adjusters 27 can be controlled via a bus system to which optionally available temperature sensors 45 are preferably connected. It is advantageous to control the power adjusters 27 via a CAN bus or via a one-wire connection.

The generator G could be used exclusively to supply the heating devices 15. However, it would also be conceivable for the generator G to supply power to other consumers provided on the road finisher 1.

The control device 39 can, for example, comprise a processor and a memory with program instructions. It would be conceivable that the control device 39 is provided as a compact component. It is also conceivable, however, that components of the control device 39 are distributed over the road finisher 1. The control device 39 could be part of or additional to a master control device of the road finisher 1.

What is claimed is:
1. A road finisher comprising:
a towing vehicle including a material hopper which is at a front in a paving travel direction for receiving paving material;
a paving screed behind the towing vehicle in the paving travel direction for compacting the paving material;
a generator provided on the towing vehicle for providing electrical power;
a plurality of electric heating devices provided on the paving screed for electrically heating the paving screed;
a power distribution arrangement having a line network configured to supply the electric heating devices with the electrical power provided by the generator, wherein the power distribution arrangement comprises a plurality of power adjusters provided on the paving screed and each power adjuster is associated with one of the electric heating devices; and
a control device configured to control the power adjusters to individually dynamically adjust the power supplied to the respectively associated electric heating device.
2. The road finisher according to claim 1, wherein the power adjusters are each configured to continuously adjust the power supplied to the respectively associated electric heating device.
3. The road finisher according to claim 1, wherein the power adjusters comprise power switches.
4. The road finisher according to claim 1, wherein each power adjuster is configured to adjust the power supplied to the respectively associated heating device by pulse package control.
5. The road finisher according to claim 1, wherein the power adjusters are each configured to adjust the power supplied to the respectively associated heating device by phase angle control.
6. The road finisher according to claim 1, wherein the power adjusters in the line network are each electrically connected upstream of the associated electric heating device.
7. The road finisher according to claim 1, wherein the power adjusters are connected in parallel to one another.
8. The road finisher according to claim 1, wherein a part of the line network located on the paving screed has nodes at which the line network branches at least towards different power adjusters and the associated heating devices.

9. The road finisher according to claim 1, wherein the line network comprises a main fuse which is connected downstream of the generator and upstream of all the heating devices.

10. The road finisher according to claim 1, wherein the control device is configured to control the power adjusters via a power line communication on the line network for supplying the heating devices with the electrical power provided by the generator, or to control the power adjusters via a CAN bus or via a one-wire connection.

11. The road finisher according to claim 1, wherein the power adjusters are configured to detect a failure or a fault condition of the associated heater and to report the failure or fault condition to the control device.

12. The road finisher according to claim 1, wherein the control device is configured to determine setting values for the power adjusters based on information including outside temperature, temperature of the paving material and/or paving thickness.

13. The road finisher according to claim 1, wherein the control device is configured to determine setting values for the power adjusters based on paving parameters including type of layer to be paved, screed configuration and/or type of paving material used.

14. The road finisher according to claim 1, wherein the control device is configured to control each power adjuster to variably adjust the power supplied to the respectively associated electric heating device from 0-100%.

15. The road finisher according to claim 1, wherein the power adjusters comprise power controllers.

16. The road finisher according to claim 15, wherein the power adjusters comprise thyristor controllers.

17. The road finisher according to claim 1, wherein the control device is configured to determine a respective setting value for the power adjusters and to control the power adjusters on the basis of the respective setting value.

18. The road finisher according to claim 17 further comprising an input device which enables an operator to enter the setting value for all heating devices together, for groups of heating devices and/or for individual heating devices.

19. The road finisher according to claim 17 further comprising one or more temperature sensors on the paving screed, wherein the control device is configured, when the power adjusters are controlled, to take into account not only the setting value but also one or more outputs of the temperature sensor or the temperature sensors.

20. The road finisher according to claim 19, wherein a temperature sensor is assigned to each power adjuster.

* * * * *